United States Patent
Yamamoto et al.

(10) Patent No.: US 9,850,560 B2
(45) Date of Patent: Dec. 26, 2017

(54) STEEL FOR WHEEL

(71) Applicant: NIPPON STEEL & SUMITOMO METAL CORPORATION, Tokyo (JP)

(72) Inventors: Yuichiro Yamamoto, Tokyo (JP); Yukiteru Takeshita, Tokyo (JP); Kentaro Kiriyama, Tokyo (JP); Takanori Kato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 149 days.

(21) Appl. No.: 14/397,241

(22) PCT Filed: Apr. 8, 2013

(86) PCT No.: PCT/JP2013/060588
§ 371 (c)(1),
(2) Date: Oct. 27, 2014

(87) PCT Pub. No.: WO2013/161548
PCT Pub. Date: Oct. 31, 2013

(65) Prior Publication Data
US 2015/0147224 A1 May 28, 2015

(30) Foreign Application Priority Data
Apr. 27, 2012 (JP) ................. 2012-102821

(51) Int. Cl.
| C22C 38/46 | (2006.01) |
| C21D 9/34 | (2006.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| B60B 17/00 | (2006.01) |
| C22C 38/08 | (2006.01) |
| C22C 38/12 | (2006.01) |
| C22C 38/16 | (2006.01) |
| C22C 38/44 | (2006.01) |
| C22C 38/22 | (2006.01) |
| C22C 38/24 | (2006.01) |
| C21D 7/13 | (2006.01) |
| C21D 1/25 | (2006.01) |

(52) U.S. Cl.
CPC .......... C22C 38/46 (2013.01); B60B 17/0006 (2013.01); C21D 9/34 (2013.01); C22C 38/00 (2013.01); C22C 38/02 (2013.01); C22C 38/04 (2013.01); C22C 38/06 (2013.01); C22C 38/08 (2013.01); C22C 38/12 (2013.01); C22C 38/16 (2013.01); C22C 38/22 (2013.01); C22C 38/24 (2013.01); C22C 38/42 (2013.01); C22C 38/44 (2013.01); C21D 1/25 (2013.01); C21D 7/13 (2013.01); C21D 2211/002 (2013.01); *C21D 2211/008* (2013.01); *C21D 2211/009* (2013.01); *C21D 2221/00* (2013.01); *C21D 2221/02* (2013.01)

(58) Field of Classification Search
CPC ......... C22C 38/00; C22C 38/02; C22C 38/04; C22C 38/06; C22C 38/08; C22C 38/12; C22C 38/16; C22C 38/22; C22C 38/24; C22C 38/34; C22C 38/42; C22C 38/44; C22C 38/46; B60B 17/0006; C21D 1/25; C21D 7/13; C21D 2211/002; C21D 2211/008; C21D 2211/009; C21D 2221/00; C21D 2221/02
See application file for complete search history.

(56) References Cited

U.S. PATENT DOCUMENTS

| 4,714,500 A | 12/1987 | Heller et al. |
| 5,899,516 A | 5/1999 | Fujimara et al. |
| 6,372,057 B1 | 4/2002 | Fujimara et al. |
| 6,783,610 B2 | 8/2004 | Shirley et al. |
| 7,559,999 B2 | 7/2009 | Hernandez et al. |
| 7,591,909 B2 | 9/2009 | Hernandez et al. |
| 2005/0268995 A1 | 12/2005 | Kato et al. |
| 2009/0051182 A1 | 2/2009 | Hernandez et al. |

(Continued)

FOREIGN PATENT DOCUMENTS

| AU | 2011330149 | 11/2011 |
| CN | 10149278 | 7/2009 |
| CN | 101928887 | 12/2010 |

(Continued)

OTHER PUBLICATIONS

Ueda et al., English machine translation of JP 11-092867, Apr. 1999, p. 1-23.*

(Continued)

*Primary Examiner* — Roy King
*Assistant Examiner* — Caitlin Kiechle
(74) *Attorney, Agent, or Firm* — Clark & Brody

(57) ABSTRACT

A steel for wheel contains, in mass %, C: 0.65 to 0.84%, Si: 0.4 to 1.0%, Mn: 0.50 to 1.40%, Cr: 0.02 to 0.13%, S: 0.04% or less and V: 0.02 to 0.12%, wherein Fn1 expressed by formula (1) is 32 to 43, and Fn2 expressed by formula (2) is 25 or less, the balance being Fe and impurities. P, Cu and Ni as impurities are P: 0.05% or less, Cu: 0.20% or less and Ni: 0.20% or less:

$$Fn1 = 2.7 + 29.5 \cdot C + 2.9 \cdot Si + 6.9 \cdot Mn + 10.8 \cdot Cr + 30.3 \cdot Mo + 44.3 \cdot V \quad (1)$$

$$Fn2 = \exp(0.76) \cdot \exp(0.05 \cdot C) \cdot \exp(1.35 \cdot Si) \cdot \exp(0.38 \cdot Mn) \cdot \exp(0.77 \cdot Cr) \cdot \exp(3.0 \cdot Mo) \cdot \exp(4.6 \cdot V) \quad (2).$$

The steel has excellent properties for use as a wheel.

4 Claims, 9 Drawing Sheets

(56) References Cited

U.S. PATENT DOCUMENTS

| | | |
|---|---|---|
| 2009/0053095 A1 | 2/2009 | Robles Hernandez et al. |
| 2009/0134647 A1 | 5/2009 | Hernandez et al. |

FOREIGN PATENT DOCUMENTS

| | | |
|---|---|---|
| CN | 102277531 | 12/2011 |
| CN | 102363865 | 2/2012 |
| DE | 19837311 | 3/2000 |
| JP | 50-104717 | 8/1975 |
| JP | 57-143469 | 9/1982 |
| JP | 6-279918 | 10/1994 |
| JP | 6-279927 | 10/1994 |
| JP | 9-202937 | 8/1997 |
| JP | 11-92867 | 4/1999 |
| JP | 2000-226634 | 8/2000 |
| JP | 2001-158940 | 6/2001 |
| JP | 2004-315928 | 11/2004 |
| JP | 2005-350769 | 12/2005 |
| RU | 2348735 | 3/2009 |
| RU | 2369658 | 10/2009 |
| RU | 2369790 | 10/2009 |
| SU | 1534089 | 1/1990 |
| SU | 1831506 | 7/1993 |
| WO | 2012/067237 | 5/2012 |

OTHER PUBLICATIONS

Sadahiro Yamamoto, Technology for the Improvement of Wear Resistance in Steels by Microstructure Control—Microstructure Control Technology in Wear Resistant Steels with Weldability—, the $161^{st}$ and $162^{nd}$ Nishiyama memorial Seminar, Heisei 8 (1996), edited by the Iron and Steel Institute of Japan, p. 221.

Yukitake Murakami—"Infruence of micro defects and inclusions", 2004, p. 182.

Ying Jin et al., Railway Technical Research Institute Report, vol. 19 (2005), No. 9, p. 17.

\* cited by examiner

STEEL FOR WHEEL

TECHNICAL FIELD

The present invention relates to steel for wheel, and more particularly to steel for wheel preferable as steel for high-hardness wheels for railways excellent in wear resistance, rolling contact fatigue resistance and spalling resistance.

Spalling is the phenomenon in which the tread of a wheel which is heated and rapidly cooled by emergency brake or the like is transformed into brittle martensite called a white layer, a crack propagation with the white layer as an origin, and a brittle fracture occurs to cause peel. Spalling is sometimes called "thermal crack".

BACKGROUND ART

In recent years, with increase in traveling distances and increase in loading capacities on a global scale, there is a need for railway wheels (hereinafter, also called "wheels") having longer life than the conventional wheels.

The damage factors on wheel tread mainly include three phenomena that are (i) wear, (ii) rolling contact fatigue and (iii) spalling, and especially in recent years, the number of wheels that are damaged by wear associated with increase in traveling distances and rolling contact fatigue associated with increase in loading capacities has been increasing. Rolling contact fatigue is sometimes called "shelling". Though a crack that is caused by spalling is sometimes called "shelling", the occurrence of the crack due to formation of a white layer is defined herein as "spalling".

High temperature rolling contact fatigue (Thermal mechanical shelling, hereinafter called "TMS") that occurs with rise in the wheel temperature during braking is currently said to be the cause of a wheel damage. With this, the wheels ensuring high temperature strength are required. For example, in the Class-D standard of AAR (Association of American Railroads), the yield strength at 538° C. (1000° F.) is defined to be 345 MPa or more.

Recently, in order to suppress crack occurrence on a wheel tread, it is required to ensure the minimum ductility, and different countries have different definitions. For example, in the Russia GOST10791 Grade 3 standard, the elongation is defined to be 8% or more, in the China TB/T 2708 CL60 definition, the elongation is defined to be 10% or more, in the Europe EN 13262 ER9 standard, the elongation is defined to be 12% or more, in the Class-D definition of AAR, the elongation is defined to be 14% or more, and the like.

It is empirically known that wear resistance and rolling contact fatigue resistance are properties contrary to spalling resistance. It is urgently required to develop the steel for wheel that is excellent in balance of wear resistance, rolling contact fatigue resistance and spalling resistance, further includes both high strength at high temperature and high ductility, and can give long life to wheels.

For example, the technology relating to wheels are disclosed in the following documents.

Patent Document 1 discloses "high toughness steel for railway wheel" adding V.

Patent Document 2 discloses "rim or monoblock wheel for a wheel set of a railway vehicle" that is excellent in wear resistance, fracture resistance and thermal crack resistance.

Patent Document 3 discloses "railway wheel" that makes shelling resistance and flat (spoiling) resistance as thermal crack resistance compatible by decreasing the content of C, and making the tread portion have a bainitic microstructure, a tempered martensitic microstructure, or a mixed microstructure of bainite and tempered martensite.

Patent Document 4 discloses "high carbon railway wheel excellent in wear resistance and thermal crack resistance" in which the content of C is increased to 0.85 to 1.20%.

Patent Document 5 discloses "railway wheel excellent in wear resistance and thermal crack resistance" that is an monoblock type railway wheel formed of steel having a chemical composition consist of C: 0.4 to 0.75%, Si: 0.4 to 0.95%, Mn: 0.6 to 1.2%, Cr: 0 to less than 0.2%, P: 0.03% or less and S: 0.03% or less, and the balance consisting of Fe and impurities, wherein the region up to at least the depth of 50 mm from the surface of the wheel tread consists of a pearlitic microstructure, and the manufacturing method thereof.

Patent Document 6 and Patent Document 7 disclose "steel for railway wheel" which are increased in strength by containing 0.01 to 0.12% and 0.009 to 0.013% of Nb respectively, and are improved in rolling contact fatigue resistance and spalling resistance.

Patent Document 8 discloses a wheel steel containing V or Nb. According to the invention, it is described that rolling contact fatigue resistance property can be ensured without thermal refining.

Patent Document 9 discloses high strength rail using steel with pearlite grains refined by Ti deoxidation. According to the invention, it is described that ductility and toughness can be improved.

Patent Document 10 discloses the material that is improved in rolling contact fatigue resistance property by defining the size of an alumina cluster.

Patent Document 11 discloses the wheel steel with high TMS resistance, which is improved in high temperature strength by increasing the contents of Si, Cr and Mo.

CITATION LIST

Patent Documents

[Patent Document 1] JP50-104717A
[Patent Document 2] JP2001-158940A
[Patent Document 3] JP2005-350769A
[Patent Document 4] JP2004-315928A
[Patent Document 5] JP9-202937A
[Patent Document 6] U.S. Pat. No. 7,559,999B
[Patent Document 7] U.S. Pat. No. 7,591,909B
[Patent Document 8] JP57-143469A
[Patent Document 9] JP6-279927A
[Patent Document 10] JP6-279918A
[Patent Document 11] U.S. Pat. No. 6,783,610B

DISCLOSURE OF THE INVENTION

Problems to be Solved by the Invention

The steel disclosed in Patent Document 1 has low wear resistance, because the content of C is as low as 0.50 to 0.60%. Accordingly, the steel cannot have sufficient performance to increase in the loading capacity of recent years.

The steel disclosed in Patent Document 2 has low wear resistance, because the content of C is as low as 0.45 to 0.55%. Accordingly, the steel cannot have sufficient performance to the increase in the loading capacity of recent years, either.

The wheel disclosed in Patent Document 3 has the tread portion consisting of a bainitic microstructure, a tempered martensitic microstructure, or a mixed microstructure of bainite and tempered martensite. Therefore, though the wheel has high strength, the wheel has lower wear resistance, as compared with the case of a tread portion consisting of a pearlitic microstructure, and obtaining wear resistance equal to or beyond a conventional freight car wheel steel is difficult. Namely, as compared with a pearlitic microstructure that is excellent in work hardening property, and showing the behavior with lamellas thereof being rearranged in parallel to the surface with progress of wear, the amount of wear become large in a bainitic microstructure and a tempered martensitic microstructure (for example, refer to Sadahiro Yamamoto: "Technology for the Improvement of Wear Resistance in Steels by Microstructure Control—Microstructure Control Technology in Wear Resistant Steels with Weldability", the 161th and 162th Nishiyama memorial Seminar, Heisei 8 (1996), edited by The Iron and Steel Institute of Japan, p. 221).

The steel of the wheel disclosed in Patent Document 4 is difficult to apply to the wheels which are produced by the treatment peculiar to wheels and called "tread quench method". As an example of the wheel, the schematic diagram of "monoblock wheel" is shown in FIG. 1. In the case of a wheel, heat treatment of cooling the rim portion is applied from the outer circumference of the wheel in order to give a compression residual stress to the rim portion after the entire wheel is heated. In the cooling treatment, the region near the rim portion is rapidly cooled, but the cooling speed of the hub portion is low. Therefore, when the steel of the wheel described in the document is heat-treated by a tread quench method, there is the possibility of hyper-eutectoid cementite precipitating in the austenite grain boundary of the hub portion. Hyper-eutectoid cementite has the same effect as coarse inclusions, and extremely reduces toughness and fatigue life (for example, refer to Yukitaka Murakami: Influence of micro defects and inclusions (2004), p. 182 "Yokendo").

The wheel disclosed in Patent Document 5 is insufficient in hardness in some cases. Accordingly, the wheel cannot always have sufficient performance to the increase in the loading capacity of recent years.

The steel for railway wheel disclosed in Patent Document 6 contains as much Mo as 0.20 to 0.30% of Mo. Therefore, the microstructure with low wear resistance such as a bainitic microstructure or a degenerate pearlitic microstructure is easily formed, and favorable wear resistance is hardly obtained. In addition, the steel always contains 0.01 to 0.12% of Nb. Coarse inclusions are sometimes formed in the steel containing Nb, and this extremely reduces toughness and fatigue life similarly to the aforementioned hyper-eutectoid cementite.

The steel for railway wheel disclosed in Patent Document 7 also always contains 0.009 to 0.013% of Nb. As described above, coarse inclusions are sometimes formed in the steel containing Nb, and this extremely reduces toughness and fatigue life similarly to hyper-eutectoid cementite.

The steel for railway wheel disclosed in Patent Document 8 contains 0.15% or more of Cr. In the steel with a high Cr content, the microstructure with low wear resistance such as a bainitic microstructure is easily formed if the cooling speed is high. In this invention, formation of these microstructures is prevented by adopting a low cooling speed of air-blast cooling or the like to the temperature region from 700° C. to 500° C. after hot forging. However, with the slow cooling, sufficient hardness is not obtained, and the steel cannot have sufficient performance to the increase in the loading capacity of recent years. Further, when the cooling speed is high, a bainitic microstructure is formed in the rim portion, and wear resistance is declined.

In the steel disclosed in Patent Document 9, coarse inclusions containing Ti are sometimes formed depending on the production process. This extremely reduces toughness and fatigue life similarly to the hyper-eutectoid cementite mentioned above.

The steel disclosed in Patent Document 10 is considered to have sufficient hardness, and a high rolling fatigue resistance property, but no attention is paid to spalling resistance.

The steel for wheel disclosed in Patent Document 11 contains 0.08% or more of Mo, and therefore, is high in high temperature strength and excellent in TMS resistance, but ductility is not taken into consideration. Further, addition of excessive Mo tends to break the lamellar microstructure of pearlite, and wear resistance tends to be declined. Further, in the case of the steel containing excessive Mo, it is difficult to ensure wear resistance because it is easy to form a bainitic microstructure in the rim portion, if the cooling speed is high.

The present invention is made to solve the problems described above, and has an objective to provide a steel for wheel that is excellent in balance of wear resistance, rolling contact fatigue resistance and spalling resistance, further includes both high yield strength at high temperature and high ductility, and can give a long life to the wheel.

Means for Solving the Problems

As the result of the present inventors variously studied wear resistance, rolling contact fatigue resistance, spalling resistance, high temperature strength and ductility, the matters of the following (a) to (e) were revealed.

(a) Wear resistance is improved more when the microstructure of the steel material is made a pearlitic microstructure, and as the hardness is higher.

(b) Rolling contact fatigue resistance is improved more as the hardness is higher irrespective of the microstructure.

(c) Spalling resistance is improved more as hardenability is lower.

(d) High temperature strength is improved more as the contents of Si and V are larger.

(e) Ductility is improved more as the Si content is larger, and the content of V is smaller.

From the above, the present inventors have reached the conclusion that in order to solve the aforementioned problems, the steel needs to be developed, in which a pearlitic microstructure is obtained by heat treatment, hardness is high and hardenability is low, and the contents of Si and V are optimized.

Hereinafter, an example of the contents that the present inventors studied will be described in detail.

First, the present inventors evaluated the influences which the respective elements have on hardness and hardenability, by a Jominy end quench test (hereinafter, called "Jominy test") which is similar to the tread quench of an actual wheel in the heat treatment conditions.

Steels 1 to 24 that have the chemical compositions shown in Table 1 were melted in a vacuum furnace on a laboratory scale and ingots were produced. From each of the ingots, a round bar 35 mm in diameter, a round bar 160 mm in diameter and a round bar 70 mm in diameter were produced by hot forging. For steel 1, a round bar 220 mm in diameter was also produced in order to produce "rail test specimen" for a rolling contact fatigue test that will be described later.

Note that steel 1 in Table 1 corresponds to the steel for railway wheel of "Class C" in the M-107/M-207 standard of AAR (Association of American Railroads).

TABLE 1

| Steel No. | Chemical Composition (mass %, the balance Fe and impurities) | | | | | | | | | | |
|---|---|---|---|---|---|---|---|---|---|---|---|
| | C | Si | Mn | P | S | Cu | Ni | Cr | Mo | V | Al |
| 1 | 0.69 | 0.29 | 0.82 | 0.013 | 0.007 | 0.01 | 0.02 | 0.08 | 0.01 | 0.01 | 0.056 |
| 2 | 0.69 | 0.80 | 0.76 | 0.011 | 0.007 | — | 0.03 | 0.10 | 0.01 | 0.01 | 0.050 |
| 3 | 0.70 | 0.82 | 0.82 | 0.004 | 0.008 | — | 0.04 | 0.09 | 0.01 | 0.10 | 0.034 |
| 4 | 0.77 | 0.83 | 0.82 | 0.004 | 0.007 | — | 0.04 | 0.09 | 0.01 | 0.09 | 0.036 |
| 5 | 0.86 | 0.85 | 0.83 | 0.004 | 0.008 | — | 0.04 | 0.10 | 0.01 | 0.01 | 0.037 |
| 6 | 0.88 | 0.50 | 0.61 | 0.004 | 0.008 | — | 0.04 | 0.25 | 0.01 | 0.01 | 0.034 |
| 7 | 0.74 | 0.80 | 0.39 | 0.004 | 0.008 | — | 0.04 | 0.45 | 0.01 | 0.09 | 0.033 |
| 8 | 0.71 | 0.79 | 0.77 | 0.014 | 0.007 | 0.01 | 0.02 | 0.10 | 0.01 | 0.09 | 0.036 |
| 9 | 0.80 | 0.78 | 0.76 | 0.014 | 0.006 | 0.01 | 0.02 | 0.10 | 0.01 | 0.09 | 0.039 |
| 10 | 0.63 | 0.79 | 0.79 | 0.014 | 0.009 | 0.01 | 0.02 | 0.10 | 0.01 | 0.09 | 0.037 |
| 11 | 0.72 | 0.23 | 0.18 | 0.003 | 0.001 | 0.01 | 0.01 | — | 0.01 | — | 0.031 |
| 12 | 0.72 | 0.25 | 0.77 | 0.003 | 0.001 | 0.01 | 0.01 | 0.19 | 0.01 | — | 0.021 |
| 13 | 0.76 | 0.25 | 0.78 | 0.003 | 0.001 | 0.01 | 0.01 | — | 0.09 | — | 0.031 |
| 14 | 0.75 | 0.25 | 0.79 | 0.004 | 0.001 | 0.01 | 0.01 | — | 0.20 | — | 0.035 |
| 15 | 0.74 | 0.23 | 0.74 | 0.003 | 0.001 | 0.01 | 0.01 | — | 0.01 | 0.09 | 0.026 |
| 16 | 0.74 | 0.79 | 0.80 | 0.004 | 0.001 | 0.01 | 0.01 | — | 0.01 | 0.05 | 0.034 |
| 17 | 0.75 | 0.86 | 0.79 | 0.004 | 0.001 | 0.01 | 0.01 | 0.15 | 0.15 | — | 0.041 |
| 18 | 0.75 | 0.81 | 0.82 | 0.003 | 0.001 | 0.01 | 0.02 | 0.42 | 0.07 | 0.07 | 0.023 |
| 19 | 0.74 | 0.65 | 0.82 | 0.004 | 0.001 | 0.01 | 0.02 | 0.54 | 0.11 | — | 0.032 |
| 20 | 0.74 | 1.10 | 0.82 | 0.003 | 0.001 | 0.01 | 0.01 | — | 0.01 | — | 0.041 |
| 21 | 0.74 | 0.23 | 2.10 | 0.004 | 0.001 | 0.01 | 0.01 | — | 0.01 | — | 0.038 |
| 22 | 0.73 | 0.25 | 0.81 | 0.003 | 0.001 | 0.01 | 0.01 | — | 0.01 | 0.21 | 0.028 |
| 23 | 0.75 | 0.79 | 0.83 | 0.003 | 0.001 | 0.01 | 0.02 | 0.82 | 0.18 | — | 0.026 |
| 24 | 0.74 | 0.84 | 0.82 | 0.004 | 0.001 | 0.01 | 0.02 | 0.54 | 0.25 | 0.08 | 0.031 |
| 25 | 0.74 | 0.84 | 0.79 | 0.015 | 0.007 | 0.01 | 0.01 | 0.09 | — | 0.10 | 0.042 |
| 26 | 0.76 | 0.84 | 0.79 | 0.015 | 0.006 | 0.01 | 0.01 | 0.09 | — | 0.05 | 0.040 |
| 27 | 0.76 | 0.83 | 0.80 | 0.016 | 0.006 | 0.01 | 0.01 | 0.09 | — | 0.02 | 0.038 |
| 28 | 0.77 | 0.24 | 0.64 | 0.015 | 0.007 | 0.01 | 0.01 | 0.19 | — | 0.10 | 0.038 |
| 29 | 0.78 | 0.24 | 0.65 | 0.015 | 0.007 | 0.01 | 0.01 | 0.19 | — | 0.08 | 0.037 |
| 30 | 0.78 | 0.23 | 0.64 | 0.014 | 0.007 | 0.01 | 0.01 | 0.19 | — | 0.05 | 0.035 |
| 31 | 0.74 | 0.46 | 0.65 | 0.012 | 0.006 | 0.01 | 0.01 | 0.11 | — | 0.09 | 0.037 |
| 32 | 0.74 | 0.43 | 0.67 | 0.011 | 0.007 | 0.01 | 0.01 | 0.10 | — | 0.05 | 0.037 |
| 33 | 0.76 | 0.44 | 0.67 | 0.011 | 0.007 | 0.01 | 0.01 | 0.10 | — | 0.03 | 0.035 |
| 34 | 0.74 | 0.67 | 0.79 | 0.012 | 0.007 | 0.01 | 0.01 | 0.10 | 0.03 | 0.04 | 0.036 |
| 35 | 0.75 | 0.68 | 0.78 | 0.013 | 0.007 | 0.01 | 0.01 | 0.11 | 0.04 | 0.05 | 0.041 |
| 36 | 0.76 | 0.68 | 0.78 | 0.012 | 0.007 | 0.01 | 0.01 | 0.10 | 0.06 | 0.09 | 0.035 |

From the round bar 35 mm in diameter, a Jominy test specimen was taken, after austenitization at 900° C. for 30 minutes under air atmosphere, end quench was performed, parallel cutting of 1.0 mm was performed next, and measurement of Rockwell C hardness (hereinafter, also called "HRC") was performed.

The HRC at the position 40 mm from the water-cooled end (hereinafter, called "40 mm hardness") was measured, and the influence which each of the elements has on the value was evaluated. As a result, it has been found out that "40 mm hardness" has a linear relationship with Fn1 expressed by the following formula (1) as follows, as shown in FIG. 2. Further, it has been found out that when Fn1 exceeds 43, as steel 23 and steel 24, bainitic microstructures are formed at least in part, and the linear relationship is not established.

Note that the HRC at the position 40 mm from the water-cooled end was measured because a wheel is machined directly under the tread after heat treatment, and is sometimes used by repeating machining after the start of use, and the property of the steel in the interior with lower hardness than the surface significantly influences the life of the wheel.

In FIG. 2, steel 1 corresponding to the steel for railway wheel of "Class C" of AAR is shown by mark "▲". Note that the microstructure at the position 40 mm from the water-cooled end was mirror-polished, thereafter, etched with nital, observed with an optical microscope, and was assessed.

$$Fn1 = 2.7 + 29.5 \times C + 2.9 \times Si + 6.9 \times Mn + 10.8 \times Cr + 30.3 \times Mo + 44.3 \times V \tag{1}$$

C, Si, Mn, Cr, Mo and V in formula (1) mean the contents in mass % of the elements.

In Table 2, the measurement values of the "40 mm hardness" described above and Fn1 expressed by the formula (1) are organized and shown.

The hardenability was evaluated by measuring the distance from the water cooled end in the unit of millimeter where the martensitic microstructure fraction is 50% (hereinafter, called "M50%") from Jominy hardness, based on the hardness in the case of the martensitic microstructure fraction being 50% described in the ASTM A255 standard. As a result, it has been found out that "M50%" has a correlation with Fn2 expressed by the following formula (2) as follows, as shown in FIG. 3. Note that in FIG. 3, steel 1 is shown by the mark "A".

$$Fn2 = \exp(0.76) \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V) \tag{2}$$

C, Si, Mn, Cr, Mo and V in formula (2) also mean the contents in mass % of the elements. The terms "exp(0.05× C)" and the like mean exponent representation of "$e^{0.05 \times C}$" and the like. Note that "e" is "Napier's constant" that is one of mathematical constants, and is used as a base of natural logarithm.

In Table 2, the measurement values of "M50%" described above and Fn2 expressed by formula (2) are organized and shown.

TABLE 2

| Steel No. | 40 mm hardness (HRC) | Fn1 | M50% (mm) | Fn2 | rolling fatigue contact life (cycle) | amount of wear (g) |
|---|---|---|---|---|---|---|
| 1 | 31.1 | 31.2 | 5.6 | 5.1 | 1,830,898 | 0.320 |
| 2 | 32.3 | 32.4 | 8.3 | 10.1 | 2,191,425 | 0.312 |
| 3 | 36.6 | 37.1 | 13.6 | 16.0 | 3,283,349 | 0.268 |
| 4 | 39.3 | 38.7 | 16.5 | 15.5 | 4,453,779 | 0.242 |
| 5 | 38.6 | 38.1 | 10.6 | 11.2 | 4,114,188 | 0.241 |
| 6 | 37.3 | 37.8 | 6.3 | 7.2 | 3,675,793 | 0.249 |
| 7 | 38.9 | 38.7 | 14.2 | 16.7 | 4,342,381 | 0.225 |
| 8 | 37.8 | 36.6 | 16.2 | 14.5 | 3,688,978 | 0.247 |
| 9 | 39.6 | 39.2 | 15.7 | 14.3 | 4,480,886 | 0.241 |
| 10 | 35.0 | 34.4 | 15.5 | 14.6 | 2,867,978 | 0.279 |
| 11 | 25.4 | 26.2 | 3.8 | 3.3 | 814,399 | 0.384 |
| 12 | 32.6 | 32.3 | 4.6 | 5.0 | 2,138,325 | 0.312 |
| 13 | 34.1 | 34.0 | 4.5 | 5.5 | 2,583,220 | 0.286 |
| 14 | 37.2 | 37.1 | 6.8 | 7.7 | 3,602,246 | 0.253 |
| 15 | 35.8 | 34.6 | 5.4 | 6.3 | 3,089,949 | 0.263 |
| 16 | 34.8 | 34.9 | 9.2 | 11.3 | 2,785,571 | 0.279 |
| 17 | 38.9 | 38.9 | 15.0 | 16.8 | 4,258,560 | 0.242 |
| 18 | 42.1 | 42.6 | 21.8 | 21.3 | 5,621,775 | 0.201 |
| 19 | 41.0 | 41.2 | 16.5 | 15.4 | 5,092,738 | 0.223 |
| 20 | 32.4 | 33.7 | 14.9 | 13.8 | 2,085,608 | 0.327 |
| 21 | 39.7 | 40.0 | 7.1 | 6.9 | 4,587,370 | 0.227 |
| 22 | 38.7 | 40.2 | 11.2 | 11.4 | 4,266,610 | 0.235 |
| 23 | 42.5 | 47.2 | 29.7 | 28.5 | 5,892,201 | 0.314 |
| 24 | 42.6 | 49.6 | 46.9 | 43.7 | 5,676,736 | 0.312 |

$Fn1 = 2.7 + 29.5 \times C + 2.9 \times Si + 6.9 \times Mn + 10.8 \times Cr + 30.3 \times Mo + 44.3 \times V$
$Fn2 = \exp(0.76) \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V)$ Next, the present inventors investigated the relationship of the rolling contact fatigue resistance and wear resistance, and Fn1 expressed by the formula (1) by using steels 1 to 24 shown in the Table 1.

Namely, the test specimen that was the round bar 160 mm in diameter which was cut into a length of 100 mm, thereafter, was heated at a temperature of 900° C. for 30 minutes, and was oil quenched was produced for each of the steels.

For steels 1 to 24, the test specimens in the configurations shown in FIG. 4(a) were firstly taken as "wheel test specimens" for use in a rolling contact fatigue test, from the regions in the centers of the test specimens produced as described above.

For steel 1, the test specimen that is the round bar 220 mm in diameter which was cut into a length of 100 mm, thereafter, was heated at 900° C. for 30 minutes, and thereafter, was oil quenched was produced, and from the central portion of the test specimen, the test specimen in the configuration as shown in FIG. 4(b) was also taken as "rail test specimen" for use in a rolling contact fatigue test.

Similarly, for steels 1 to 24, the test specimens that were the round bars 70 mm in diameter which were cut into lengths of 100 mm, thereafter, were heated at 900° C. for 30 minutes, and thereafter, were oil-quenched were produced. From the regions in the centers of the test specimens, the test specimens in the configuration as shown in FIG. 5(a) were taken as "wheel test specimens" for use in wear test.

For steel 1, the round bar test specimen 100 mm in length and 70 mm in diameter for which the heat treatment similar to the wheel test specimens described above was carried out was produced, and from the region in the center thereof, the test specimen in the configuration shown in FIG. 5(b) was also taken as "rail test specimen" for use in wear test.

First, a rolling contact fatigue test was carried out by the method schematically shown in FIG. 6 with use of the wheel test specimens shown in FIG. 4(a) of the steels 1 to 24, and the rail test specimen shown in FIG. 4(b) of steel 1.

The conditions of the rolling contact fatigue test were the Hertzian stress: 1100 MPa, the slip ratio: 0.28%, the revolutions: 1000 rpm at the wheel side, and 602 rpm at the rail side, and the test was carried out under water lubrication. The test was carried out while the acceleration was monitored with a vibration accelerometer, and the number of cycles in which 0.5 G was detected was evaluated as the rolling contact fatigue life. Note that 0.5 G was set as the reference, because as the result of evaluating the relationship of the detection acceleration and the damage state in the preliminary test in advance, obvious occurrence of peel onto the contact surface was able to be confirmed in the case of the acceleration exceeding 0.5 G.

In Table 2, the rolling contact fatigue life is shown in combination. Further, in FIG. 7, the relationship of the rolling contact fatigue life and Fn1 expressed by the formula (1) is shown.

Note that "2.E+06" in the FIG. 7 and the like mean "2.0×10$^6$" and the like. In FIG. 7, steel 1 is also shown by the mark "▲".

As shown in FIG. 7, it has been found out that the rolling contact fatigue life has a correlation with Fn1 expressed by the formula (1), and if Fn1 is 32 or more, the rolling contact fatigue life can be that of steel 1 corresponding to the steel for railway wheel of "Class C" of AAR or more.

Further, the wear test was carried out by the method schematically shown in FIG. 8 with use of the wheel test specimens shown in FIG. 5(a) of steels 1 to 24, and the rail test specimen shown in FIG. 5(b) of steel 1. Note that in the wear test, the Nishihara-type wear testing machine was used.

The specific test conditions were the Hertzian stress: 2200 MPa, the slip ratio: 0.8%, and the revolutions: 776 rpm at the wheel side, and 800 rpm at the rail side, and the test was carried out under dry condition. After the test was performed up to the number of cycles of 5×10$^5$ times, the amount of wear was obtained from the mass difference of the test specimen before and after the test.

In Table 2, the amount of wear is shown in combination. Further, in FIG. 9, the relationship of the amount of wear and Fn1 expressed by the formula (1) is shown. In FIG. 9, steel 1 is shown by the mark "▲".

It has been found out that as long as the microstructure is a pearlitic microstructure, the amount of wear decreases in proportion to Fn1 expressed by the formula (1), and if Fn1 is 32 or more, the amount of wear can be made that of steel 1 or less, as shown in FIG. 9.

When Fn1 exceeds 43, a bainitic microstructure is formed at least in part as described above. It can be confirmed that when a bainitic microstructure is contained, the amount of wear does not decrease even if Fn1 increases, and the wear resistance is inferior as compared with the case of the microstructure in which pearlite predominates.

Ying JIN et al. report in Railway Technical Research Institute Report, Vol. 19 (2005) No 9, p. 17 that as the thickness of the quenched layer called a white layer is larger, the crack depth becomes larger, and spalling (meaning "spalling" herein, though described as "shelling" in the sentences) is likely to occur.

Thus, the present inventors also studied the influence which hardenability has on spalling in detail.

From the report of Ying JIN et al., it is predicted that as hardenability becomes larger, the thickness of the white layer increases more, a crack occurs and spalling occurrence life declines, and therefore, the relationship of the hardenability and crack initiation life in the case of the white layer being formed was investigated.

More specifically, "wheel test specimens" in the configuration shown in FIG. 4(a) of steel 1, steel 2, steel 5, steel 11, steel 12 and steel 14 described in Table 1, and "rail test specimen" in the configuration shown in FIG. 4(b) of steel 1 were used. The thick white layer leading to spalling was formed on the test surfaces of "wheel test specimens" by YAG laser, after which, the rolling contact fatigue test was carried out, and crack initiation life (spalling resistance) was investigated. The conditions of the YAG laser heating were the output power of laser: 2500 W, and the feed rate: 1.2 m/min, and the white layer was air-cooled after the laser heating.

Note that the conditions of the rolling contact fatigue test were the Hertzian stress: 1100 MPa, the slip ratio: 0.28%, the revolutions: 100 rpm at the wheel side, and 60 rpm at the rail side, and the test was carried out under water lubrication. Note that the test was stopped every 200 cycles up to the number of rolling cycles of 2000 times, and every 2000 cycles when the number of rolling cycles exceeds 2000 cycles, and presence and absence of a crack on the surfaces of the test specimens were visually checked.

As a result, it has been found out that the thickness of the white layer increases with increase in Fn2 expressed by the formula (2) which is correlated with "M50%" that is an index of hardenability, and with this, crack initiation life abruptly decreases, as shown in FIGS. 10 and 11.

Furthermore, it has been found out that when Fn2 exceeds 25, the crack initiation life is reduced so extremely that a crack can be already confirmed by the first visual inspection (namely, the visual inspection at the number of rolling cycles of 200 times).

Form the result described above, the present inventors have concluded that if the chemical composition of a steel is set so that Fn2 expressed by the formula (2) is 25 or less, extreme reduction in crack initiation life, that is spalling occurrence life, can be avoided.

Next, the present inventors melted steel 1, and steels 25 to 36 of Table 1 in the vacuum furnace on a laboratory scale, produced ingots, produced round bars 70 mm in diameter by hot forging from the respective ingots, heated and oil quenched the round bars, and took the high temperature tensile test specimens 6 mm in diameter of GL 25 mm in accordance with the ASTM E8 standard, and the normal temperature tensile test specimens 12.5 mm in diameter of GL 50 mm in accordance with the ASTM E370 standard, from the internal pearlitic microstructure portions.

With use of these test specimens, the tensile test at 538° C. (1000° F.) was carried out in accordance with the ASTM E21 standard, and the influences which the components have on the high temperature yield strength were investigated. Further, a normal temperature tensile test was carried out in accordance with the ASTM E370 standard. The results thereof are shown in Table 3. Further, FIGS. 12 and 13 respectively show the diagrams in which the results of the high temperature yield strength and the normal temperature elongation are organized with the V contents.

TABLE 3

| Steel No. | high temperature yield strength (MPa) | normal temperature elongation (%) |
|---|---|---|
| 1 | 295 | 14.3 |
| 25 | 403 | 12.5 |

TABLE 3-continued

| Steel No. | high temperature yield strength (MPa) | normal temperature elongation (%) |
|---|---|---|
| 26 | 366 | 13.4 |
| 27 | 346 | 15.1 |
| 28 | 372 | 10.2 |
| 29 | 361 | 10.4 |
| 30 | 325 | 12.2 |
| 31 | 380 | 12.0 |
| 32 | 363 | 13.4 |
| 33 | 347 | 14.2 |
| 34 | 385 | 12.9 |
| 35 | 409 | 12.1 |
| 36 | 445 | 10.1 |

As shown in Table 3, and FIGS. 12 and 13, the high temperature yield strength is improved more as the V content is higher, and the normal temperature elongation is improved more as the V content is lower. It has been found out that in particular, the steel with the Si content being 0.4% or more (described as high Si in the drawings) is higher in both the high temperature yield strength and the normal temperature elongation than the steel with the Si content being less than 0.4% (described as low Si in the drawings).

From the above study, in order to obtain sufficient high temperature yield strength and normal temperature elongation, it is effective to contain 0.4% or more of Si, and contain V in the range of 0.02% to 0.12%.

The present invention is completed based on the above described finding, and a gist thereof is in steels for wheel shown in the following (A) and (B).

(A) A steel for wheel comprising: in mass %, C: 0.65 to 0.84%; Si: 0.4 to 1.0%; Mn: 0.50 to 1.40%; Cr: 0.02 to 0.13%; S: 0.04% or less and V: 0.02 to 0.12%, wherein Fn1 expressed by the following formula (1) is 32 to 43, and Fn2 expressed by the following formula (2) is 25 or less, the balance being Fe and impurities, and P, Cu and Ni in the impurities are P: 0.05% or less, Cu: 0.20% or less, and Ni: 0.20% or less;

$$Fn1 = 2.7 + 29.5 \times C + 2.9 \times Si + 6.9 \times Mn + 10.8 \times Cr + 30.3 \times Mo + 44.3 \times V \quad (1)$$

$$Fn2 = \exp(0.76) \times \exp(0.05 \times \exp(1.35 \times Si) \times \exp(0.38 \times Mn) \times \exp(0.77 \times Cr) \times \exp(3.0 \times Mo) \times \exp(4.6 \times V) \quad (2)$$

where each symbol of element in formulas (1) and (2) means content (mass %) of each element.

(B) The steel for wheel according to claim 1, comprising, in mass %, Mo: 0.07% or less in place of a part of Fe, and a total content of V and Mo is 0.02 to 0.12%.

"Impurities" refers to components which are mixed into a steel material from raw materials such as ores and scraps, etc. or by other causes while the steel material is commercially manufactured.

Advantageous Effects of Invention

The steel for wheel of the present invention is excellent in balance of wear resistance, rolling contact fatigue resistance and spalling resistance, and can give a long life to wheel. As compared with the wheel with the steel for railway wheel of "Class C" of AAR, the wheel with the steel for wheel of the present invention has the amount of wear at the same extent or less and decreased by 30% at the largest, and the rolling contact fatigue life equivalent to or more and increased by 3.2 times at the largest, and has a low risk of occurrence of spalling. Further, the steel for wheel of the present invention includes both high temperature strength and ductility, and therefore, has a low risk of occurrence of TMS and a crack on the tread. Accordingly, the steel for wheel of the present invention is extremely favorable for use as a railway wheels that are used under extremely harsh environments where the traveling distances increase and the loading capacities increase.

MODE FOR CARRYING OUT THE INVENTION

Figure 1:
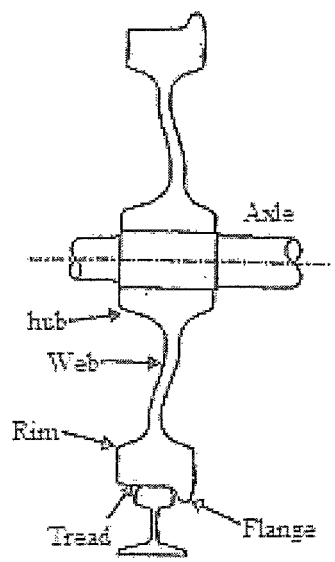
FIG. 1 is a view schematically explaining "monoblock wheel" as an example of a wheel.
Figure 2:
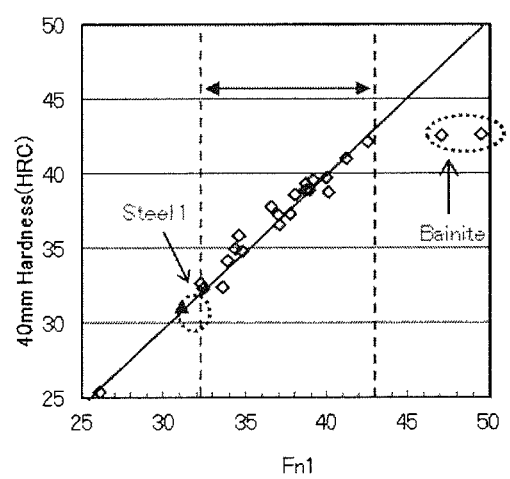
FIG. 2 is a diagram organizing and showing a relationship of "40 mm hardness" that is Rockwell C hardness at a position 40 mm from a water cooled end and "Fn1" expressed by the formula (1), with respect to steels 1 to 24. "Bainite" in the drawing indicates that a bainitic microstructure is formed in part.
Figure 3:
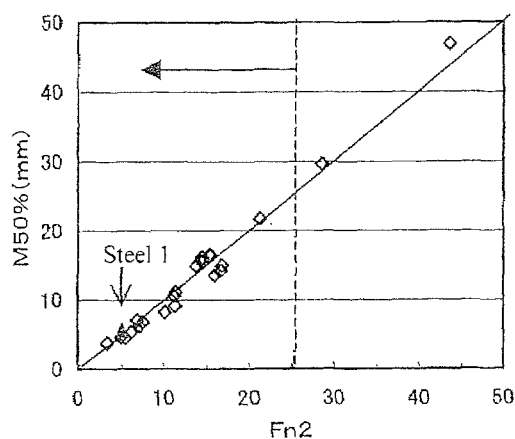
FIG. 3 is a diagram organizing and showing a relationship of "M50%" that is a distance from a water-cooled end in a unit of millimeter where a martensitic microstructure fraction becomes 50% and "Fn2" expressed by the formula (2), with respect to steels 1 to 24.

Hereinafter, respective requirements of the present invention will be described in detail. Note that "%" of a content of each element means "mass %".

C: 0.65 to 0.84%

C increases hardness, and improves wear resistance and rolling contact fatigue resistance. Further, C in this range has a small influence on hardenability, and can increase hardness without reducing spalling resistance so much. When the content of C is below 0.65%, sufficient hardness cannot be obtained, an area fraction of ferrite further increases, and wear resistance is reduced. When the content of C exceeds 0.84%, coarse hyper-eutectoid cementite is formed in a wheel hub portion, and sometimes extremely reduced toughness and fatigue life, which is not favorable in safety. Therefore, the content of C is set at 0.65 to 0.84%. The content of C is preferably set at 0.68% or more, and is preferably set at 0.82% or less.

Si: 0.4 to 1.0%

Si is an element that increases hardness by decreasing the lamellar spacing of pearlite, and solid-solution strengthening ferrite in a pearlitic microstructure, and further increases high temperature strength and ductility. When the content of Si is below 0.4%, the aforementioned effects are insufficient, and it is difficult to obtain high temperature strength and ductility. When the content of Si exceeds 1.0%, toughness is reduced, hardenability is further increased and spalling resistance is also reduced. Therefore, the content of Si is set at 0.4 to 1.0%. However, in order to increase hardness, high temperature strength and ductility by Si, the content thereof is preferably set at 0.5% or more in particular, and is more preferably set at 0.65% or more. Meanwhile, Si increases hardenability, and therefore, the content thereof is preferably set at 0.90% or less.

Mn: 0.50 to 1.40%

Mn is an element that increases hardness by decreasing lamellar spacing of pearlite, and solid-solution strengthening ferrite in a pearlitic microstructure. Mn also has an effect of forming MnS to trap S in the steel, and suppressing grain boundary embrittlement. When the content of Mn is less than 0.50%, the aforementioned effects, above all, the trapping effect of S becomes insufficient. When the content of Mn exceeds 1.40%, a bainitic microstructure is formed to reduce wear resistance, hardenability is further increased, and spalling resistance is also reduced. Therefore, the content of Mn is set at 0.50 to 1.40%. The content of Mn is preferably set at 1.20% or less.

Cr: 0.02 to 0.13%

Cr has the effect of significantly increasing the hardness of pearlite by decreasing lamellar spacing of the pearlite. When the content of Cr is less than 0.02%, these effects are not sufficient. When the content of Cr exceeds 0.13%, carbides are difficult to dissolve into austenite at the time of heating, and depending on the heating conditions, there arise the possibility of undissolved carbides being formed to reduced hardness, toughness, fatigue strength and the like. Further, when a heat-treated wheel is produced, a bainitic microstructure with low wear resistance is easily formed directly under a tread. Further, hardenability is increased, and spalling resistance is reduced. Therefore, the content of Cr is set at 0.02 to 0.13%. The content of Cr is preferably set at 0.05% or more, and is preferably set at 0.12% or less.

S: 0.04% or less

S is an impurity normally contained in steel, and has a small influence on hardness and hardenability, but has the effect of improving machinability. Therefore, S may be positively contained, but excessive S reduced toughness of steel. Therefore, the content of S is set at 0.04% or less. The content of S is preferably set at 0.03% or less. Note that the effect of improving machinability is remarkable when the content of S is 0.005% or more.

V: 0.02 to 0.12%

V precipitates on ferrite in pearlite as a V carbide, and has the effect of significantly increasing the hardness of the pearlite. Further, V has the effect of increasing yield strength at a high temperature. When the content of V is less than 0.02%, these effects are not sufficient. When V exceeding 0.12% is contained, normal temperature elongation is reduced, in addition to which, hardenability is increased, and spalling resistance is reduced. Therefore, when V is contained, the content thereof is set at 0.02 to 0.12%. The content of V is preferably set at 0.07% or less, and is more preferably set at 0.05% or less.

Fn1 (refer to formula (1)): 32 to 43

When Fn1 is less than 32, wear resistance and rolling contact fatigue resistance are hardly improved as compared with the case of using the steel for railway wheel of "Class C" of AAR, and depending on the case, wear resistance and rolling contact fatigue resistance become lower than "Class C". Therefore, steel with Fn1 being less than 32 is difficult to use as the steel of a railway wheel used under extremely harsh environments in which the traveling distances increase and loading capacities increase. When Fn1 exceeds 43, it becomes difficult to obtain a microstructure consisting principally of pearlite, and wear resistance is reduced. Further, hardness increases too much, and therefore, ductility and toughness are reduced. Therefore, Fn1 is set to be in a range of 32 to 43. Fn1 is preferably 37 or less, and is more preferably 36 or less.

Fn2 (refer to formula (2)): 25 or less

When Fn2 exceeds 25, hardenability becomes high, which leads to reduced in spalling resistance. Fn2 is preferably 20 or less, and is more preferably 15 or less.

Note that when Fn2 is less than 3, it becomes difficult to make Fn1 expressed by the formula (1) 32 or more. Therefore, Fn2 is preferably 3 or more.

One of steels for wheel of the present invention contains the above described elements, the balance consists of Fe and impurities, and the contents of P, Cu and Ni as the impurities should be limited to a certain range. The range of the contents of the respective elements and the reason of limitation are as follows.

P: 0.05% or less

P is an impurity contained in steel. When the content of P exceeds 0.05%, toughness is reduced. Accordingly, the content of P in the impurities is set at 0.05% or less. The content of P, which is more preferable, is 0.025% or less.

Cu: 0.20% or less

Cu is an impurity contained in steel. When the content of Cu exceeds 0.20%, the occurrence of a surface defect at the production time increases, hardenability is further increased, and spalling resistance is reduced. Accordingly, the content of Cu in the impurities is set at 0.20% or less. The content of Cu which is more preferable is 0.10% or less.

Ni: 0.20% or less

Ni is an impurity contained in steel. When the content of Ni exceeds 0.20%, hardenability is increased and spalling resistance is reduced. Accordingly, the content of Ni in the impurities is set at 0.20% or less. The content of Ni which is more preferable is 0.10% or less.

The steel for wheel of the present invention may contain Mo in place of part of Fe, in accordance with necessity. The range of the content of Mo and the reason of limitation are as follows.

Mo: 0.07% or less

Mo has an effect of increasing the hardness of pearlite, and has the effect of increasing yield strength at a high temperature, similarly to V. When the content of Mo exceeds 0.07%, it become easy to form a bainitic microstructure directly under a tread to reduced wear resistance when a heat-treated wheel is produced, hardenability is further increased, and spalling resistance is reduced. Therefore, when Mo is contained, the content thereof is set at 0.07% or less. The content of Mo is preferably set at 0.02% or more.

Especially when both V and Mo are contained, the total content (V+Mo) is set at 0.02 to 0.12%. The upper limit that is more preferable is 0.07%, and the upper limit that is far more preferable is 0.05%.

The steel for wheel of the present invention may contain Al in accordance with necessity. A range of the content of Al and the reason of limitation are as follows.

Al: 0.20% or less

Al may be contained, because Al has the effect of refining grains to improve toughness. However, if the content of Al exceeds 0.20%, coarse inclusions increase, and reduced toughness and fatigue strength. Accordingly, when Al is contained, the content thereof is set at 0.20% or less. The Al content is preferably set at 0.08% or less. The effect of improving toughness is remarkable when the Al content is 0.002% or more. In particular, the Al content is preferably set at 0.011% or more.

The microstructure of the wheel with the steel for wheel of the present invention desirably has 90% or more of the area fraction of the pearlitic microstructure with respect to the rim portion, and the most desirably has 100% of pearlitic microstructure. The reason is that the microstructures other than the microstructure of pearlite, such as the microstructures of ferrite and bainite have low wear resistance, and therefore, the total area fraction of the microstructures other than the microstructure of pearlite is desirably 10% or less. Further, the microstructure in which hyper-eutectoid cementite does not precipitate is desired. The reason thereof is that precipitation of hyper-eutecticoid cementite reduce toughness.

With respect to the hub portion, the microstructure is desirably similar to that of the rim portion, and it does not especially become a problem if the area fraction of the microstructures other than pearlite exceeds 10%. However, the microstructure in which hyper-eutectoid cementite does not precipitate is desirable. The reason thereof is that there is the case in which precipitation of the hyper-eutecticoid cementite causes extreme reduced of toughness and fatigue life, and at least formation of the hyper-eutecticoid cementite that can be observed by an optical microscope has to be avoided.

The wheel which adopts the steel for wheel of the present invention as can be produced by sequentially performing treatments described in the following <1> to <3>, for example. After the treatment of <3>, temper treatment may be performed.

<1> Melt and Casting of Steel:

After steel is melted by an electric furnace, a converter or the like, the steel is cast into an ingot. Note that the ingot may be any one of a cast piece by continuous casting, and an ingot molded in a mold.

<2> Forming into Wheel:

In order to form the steel into a predetermined wheel configuration, the steel is formed by a proper method such as hot forging and machining directly from the ingot, or after the ingot is formed into end steel pieces. Note that the steel may be directly formed into a wheel configuration by casting, but hot forging is desirably performed.

<3> Quench:

A quench method give a compression residual stress to the rim portion, such as "tread quench method" is adopted. Note that the heating temperature on the occasion of quench is preferably set at $Ac_3$ point to ($Ac_3$ point+250° C.). When the heating temperature is less than $Ac_3$ point, the steel is not transformed into austenite, and pearlite with high hardness cannot be obtained by cooling after heating in some cases, whereas when the heating temperature exceeds ($Ac_3$ point+250° C.), the grains coarsen and toughness is reduced in some cases, which is not preferable in performance of a wheel.

Cooling after heating is preferably performed by a proper method such as water cooling, oil cooling, mist cooling, and air cooling so as to obtain the desirable microstructure described above for the wheel, with the size of the wheel, the facility and the like taken into consideration.

Hereinafter, the present invention will be described more specifically according to examples, but the present invention is not limited to these examples.

Examples

After steels 37 to 63 of Table 4 were melted in an electric furnace, the steels were cast into molds 513 mm in diameter to produce ingots, the respective ingots were each cut into a length of 300 mm, and were heated to 1200° C., after which, the respective ingots were subjected to hot forging by a normal method to produce wheels 965 mm in diameter. The wheels each has the configuration of "AAR TYPE: B-38" described in the M-107/M-207 standard of AAR.

TABLE 4

| Steel No. | Chemical Composition (mass %, the balance Fe and impurities) | | | | | | | | | | | | |
|---|---|---|---|---|---|---|---|---|---|---|---|---|---|
| | C | Si | Mn | P | S | Cu | Ni | Cr | Mo | V | Al | Fn1 | Fn2 |
| 37 | 0.69 | 0.29* | 0.78 | 0.014 | 0.011 | 0.02 | 0.02 | 0.09 | — | —* | 0.024 | 30.3* | 4.7 |
| 38 | 0.57* | 0.46 | 0.82 | 0.017 | 0.008 | 0.03 | 0.03 | 0.07 | — | 0.16* | 0.042 | 34.3 | 12.2 |
| 39 | 0.88* | 0.47 | 0.81 | 0.014 | 0.011 | 0.02 | 0.02 | 0.07 | — | —* | 0.043 | 36.4 | 6.1 |
| 40 | 0.72 | 0.89 | 0.83 | 0.016 | 0.012 | 0.03 | 0.02 | 0.11 | — | 0.06 | 0.045 | 36.1 | 14.6 |
| 41 | 0.73 | 0.48 | 1.18 | 0.014 | 0.009 | 0.02 | 0.03 | 0.11 | — | 0.08 | 0.034 | 38.5 | 10.4 |
| 42 | 0.79 | 0.83 | 1.15 | 0.013 | 0.008 | 0.02 | 0.02 | 0.13 | — | 0.12 | 0.041 | 43.1* | 20.3 |
| 43 | 0.75 | 0.49 | 0.83 | 0.013 | 0.012 | 0.03 | 0.02 | 0.13 | — | 0.04 | 0.04 | 35.1 | 7.8 |
| 44 | 0.71 | 0.49 | 0.81 | 0.015 | 0.012 | 0.02 | 0.03 | 0.09 | — | 0.11 | 0.039 | 36.5 | 10.4 |
| 45 | 0.66 | 0.45 | 0.68 | 0.016 | 0.009 | 0.03 | 0.02 | 0.05 | — | 0.03 | 0.035 | 30.0* | 6.3 |
| 46 | 0.79 | 0.48 | 0.80 | 0.014 | 0.011 | 0.03 | 0.02 | 0.11 | 0.10* | 0.18* | 0.041 | 45.1* | 19.4 |
| 47 | 0.71 | 1.02* | 0.82 | 0.016 | 0.008 | 0.02 | 0.02 | 0.07 | 0.10* | 0.10* | 0.035 | 40.5 | 27.1* |
| 48 | 0.76 | 0.81 | 0.79 | 0.014 | 0.009 | 0.03 | 0.03 | 0.12 | — | 0.11 | 0.043 | 39.1 | 16.3 |
| 49 | 0.72 | 0.48 | 0.83 | 0.014 | 0.034 | 0.02 | 0.02 | 0.10 | — | 0.08 | 0.041 | 35.7 | 9.1 |
| 50 | 0.73 | 0.48 | 0.80 | 0.015 | 0.008 | 0.09 | 0.02 | 0.09 | — | 0.09 | — | 36.1 | 9.3 |
| 51 | 0.71 | 0.47 | 0.83 | 0.016 | 0.012 | 0.02 | 0.08 | 0.09 | — | 0.09 | — | 35.7 | 9.3 |
| 52 | 0.73 | 0.47 | 0.80 | 0.014 | 0.009 | 0.02 | 0.03 | 0.10 | — | 0.09 | 0.091 | 36.2 | 9.3 |
| 53 | 0.73 | 0.67 | 0.81 | 0.016 | 0.008 | 0.02 | 0.02 | 0.11 | — | 0.02 | — | 33.8 | 8.9 |
| 54 | 0.72 | 0.68 | 0.82 | 0.014 | 0.009 | 0.02 | 0.02 | 0.10 | — | 0.04 | — | 34.4 | 9.8 |
| 55 | 0.72 | 0.68 | 0.83 | 0.016 | 0.011 | 0.02 | 0.03 | 0.10 | — | 0.11 | — | 37.6 | 13.6 |
| 56 | 0.72 | 0.25* | 0.81 | 0.015 | 0.010 | 0.02 | 0.02 | 0.10 | — | 0.02 | — | 32.2 | 5.0 |
| 57 | 0.72 | 0.24* | 0.81 | 0.014 | 0.010 | 0.03 | 0.02 | 0.09 | — | 0.11 | — | 36.1 | 7.4 |
| 58 | 0.74 | 0.85 | 0.84 | 0.014 | 0.008 | 0.03 | 0.02 | 0.13 | 0.01 | 0.04 | 0.025 | 36.3 | 13.2 |
| 59 | 0.70 | 0.76 | 0.78 | 0.016 | 0.011 | 0.02 | 0.03 | 0.07 | — | 0.02 | 0.054 | 32.6 | 9.6 |
| 60 | 0.66 | 0.43 | 0.62 | 0.015 | 0.009 | 0.03 | 0.02 | 0.02 | — | 0.04 | — | 29.7* | 6.1 |
| 61 | 0.72 | 0.72 | 0.81 | 0.013 | 0.011 | 0.02 | 0.03 | 0.09 | 0.03 | 0.03 | — | 34.8 | 10.7 |
| 62 | 0.73 | 0.73 | 0.79 | 0.014 | 0.008 | 0.03 | 0.02 | 0.11 | 0.03 | 0.07 | — | 37.0 | 13.2 |
| 63 | 0.73 | 0.70 | 0.79 | 0.016 | 0.011 | 0.02 | 0.02 | 0.11 | 0.06* | 0.09* | — | 38.7 | 15.2 |

*means it does not satisfy the claimed range.
Fn1 = 2.7 + 29.5 × C + 2.9 × Si + 6.9 × Mn + 10.8 × Cr + 30.3 × Mo + 44.3 × V
Fn2 = exp(0.76) × exp(0.05 × C) × exp(1.35 × Si) × exp(0.38 × Mn) × exp(0.77 × Cr) × exp(3.0 × Mo) × exp(4.6 × V)

Figure 14:
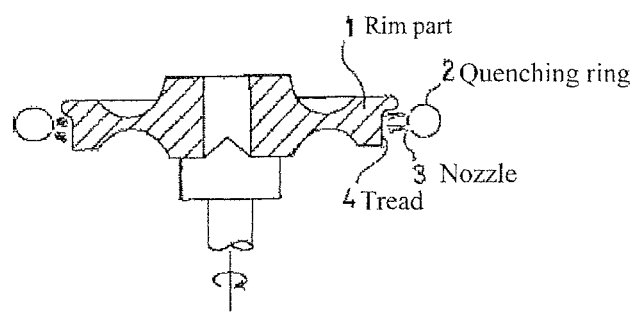
FIG. 14 is a view explaining equipment used in an example for performing so-called "tread quench" for a wheel.

Next, after the respective wheels were heated at 900° C. for two hours, the respective wheels were heat-treated by the method which cools the wheels by injecting water from nozzles while rotating the wheels (so-called "tread quench") with use of the equipment shown in FIG. 14. After the heat treatment, temper treatment (treatment of cooling the wheels in air atmosphere after keeping the wheels at 500° C. for two hours) was carried out.

With respect to the wheels produced like this, a hardness test of the rim portions, microstructure examination of the rim portions and the hub portions, wear test, a rolling contact fatigue test and a Jominy test were carried out. The results are shown in Table 5. For the respective tests, the test result of steel 37, which corresponds to the steel for railway wheel of "Class C" of AAR was used as the reference.

Figure 15:
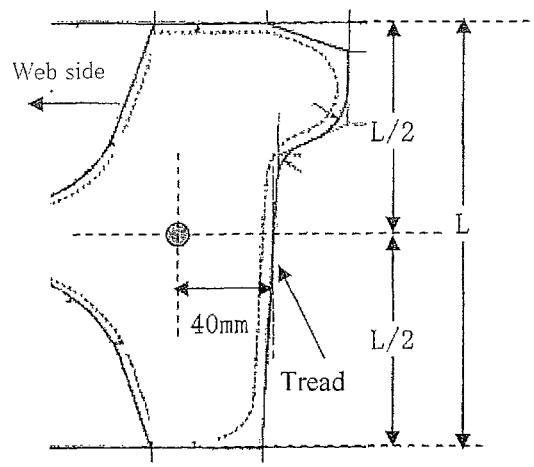
FIG. 15 is a view explaining a measurement position of Brinell hardness of the wheel produced in the example.

[1] Hardness Test of the Rim Portions:

For each of the steels, the Brinell hardness (hereinafter, called "HBW") in the position 40 mm from the tread of the tread central portion of the rim portion was measured, as shown in FIG. 15.

[2] Microstructure Examination of the Rim Portions

Figure 16:
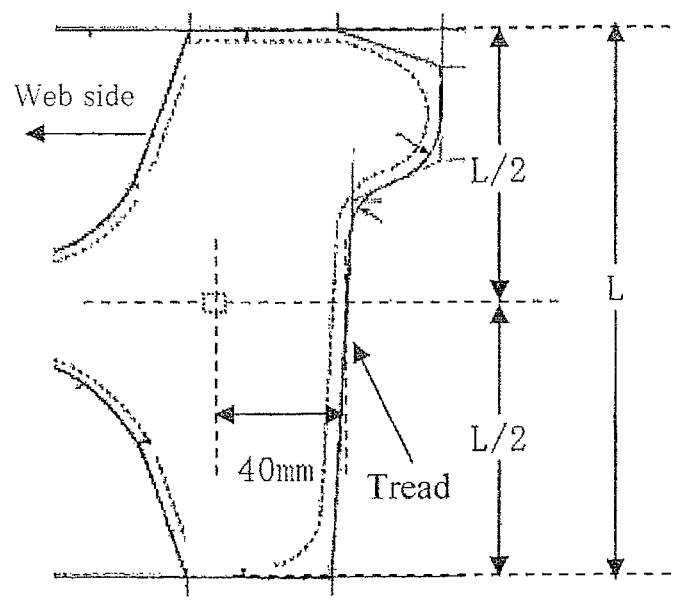
FIG. 16 is a view explaining a position where a microstructure of a rim portion of the wheel produced in the example was examined.

For each of the steels, the microstructure in the position 40 mm from the tread of the tread central portion of the rim portion was examined, as shown in FIG. 16. Note that the tread central portion was etched with nital, and the microstructure was observed with an optical microscope under magnification of 400 times, and was identified.

Note that when the microstructure contains ferrite or bainitic microstructure, the area fraction thereof was measured, and when the microstructure contains 5% or more of ferrite or bainitic microstructure, it is recognized as a microstructure that contains ferrite and bainite. When the microstructure contains ferrite or bainite, "P+F" or "P+B" was described in Table 5 which will be described later.

Figure 17:
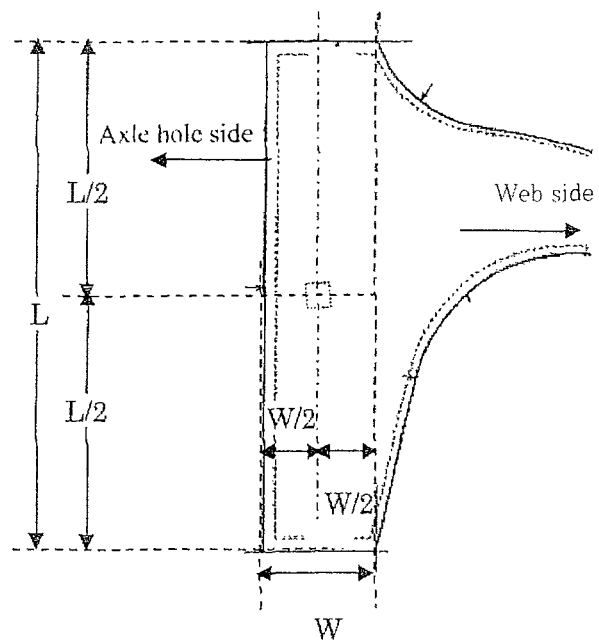
FIG. 17 is a view explaining a position where a microstructure of a hub portion of the wheel produced in the example was examined.

[3] Microstructure Examination of the Hub Portion:

For each of the steels, the microstructure in the central position of the hub portion was examined, as shown in FIG. 17. Note that the hub portion was etched with nital, and the microstructure is observed similarly to the rim portion.

Figure 5:
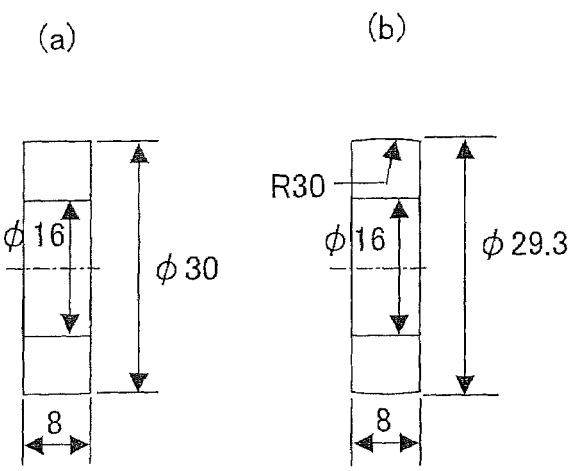
FIG. 5 is a view showing configurations of "wheel test specimen" and "rail test specimen" used in wear test. (a) in the drawing shows "wheel test specimen", and (b) shows "rail test specimen". Note that the unit of the dimensions in the drawing is "mm".
Figure 6:
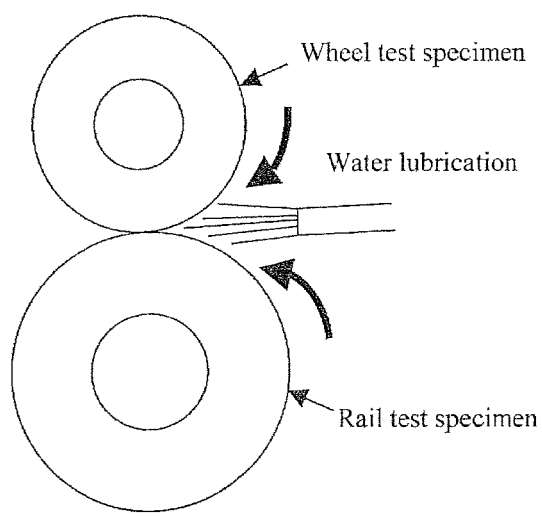
FIG. 6 is a view schematically explaining a method for a rolling contact fatigue test using the wheel test specimen shown in FIG. 4(a), and the rail test specimen shown in FIG. 4(b).
Figure 7:
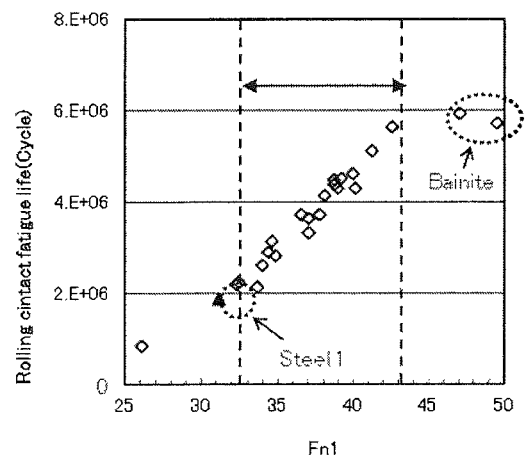
FIG. 7 is a diagram organizing and showing a relationship of rolling contact fatigue life and "Fn1" expressed by the formula (1). "Bainite" in the drawing indicates that a bainitic microstructure is formed in part.
Figure 8:
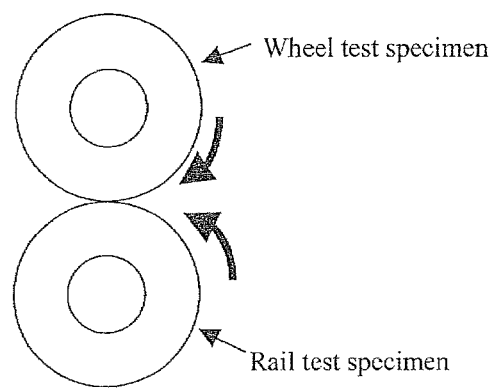
FIG. 8 is a view schematically explaining a method for wear test using the wheel test specimen shown in FIG. 5(a) and the rail test specimen shown in FIG. 5(b).
Figure 9:
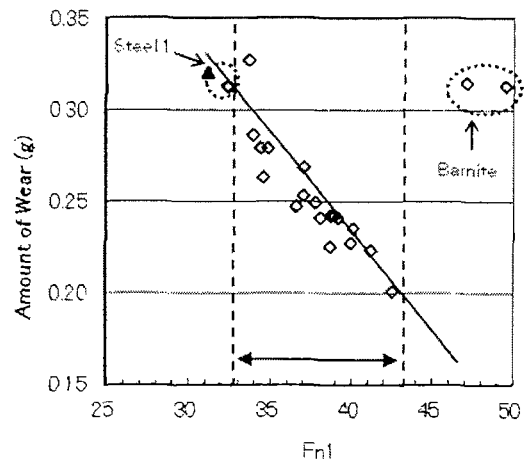
FIG. 9 is a diagram organizing and showing a relationship of amount of wear and "Fn1" expressed by the formula (1). "Bainite" in the drawing indicates that a bainitic microstructure is formed in part.
Figure 10:
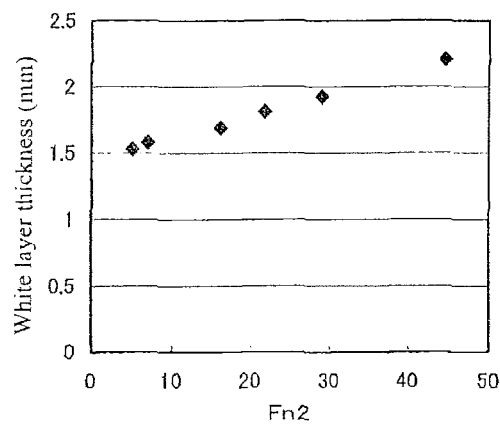
FIG. 10 is a diagram organizing and showing a relationship of a thickness of a white layer and "Fn2" expressed by the formula (2), with respect to each of steel 1, steel 2, steel 5, steel 11, steel 12 and steel 14.
Figure 11:
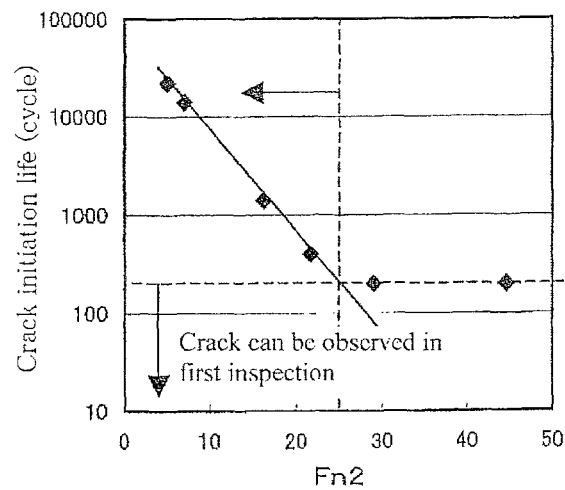
FIG. 11 is a diagram organizing and showing a relationship of crack initiation life and "Fn2" expressed by the formula (2), with respect to each of steel 1, steel 2, steel 5, steel 11, steel 12 and steel 14.
Figure 12:
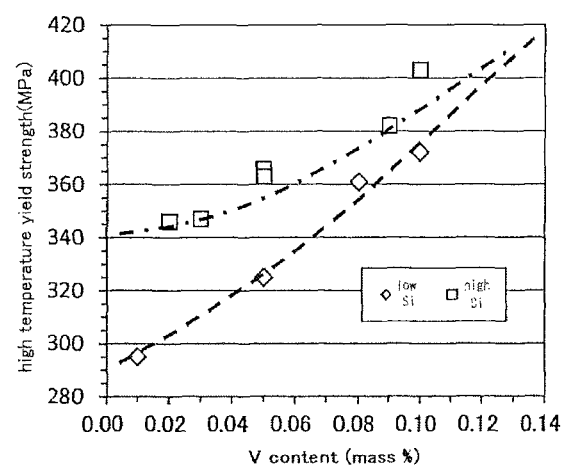
FIG. 12 is a diagram organizing a result of high temperature yield strength with V content.
Figure 13:
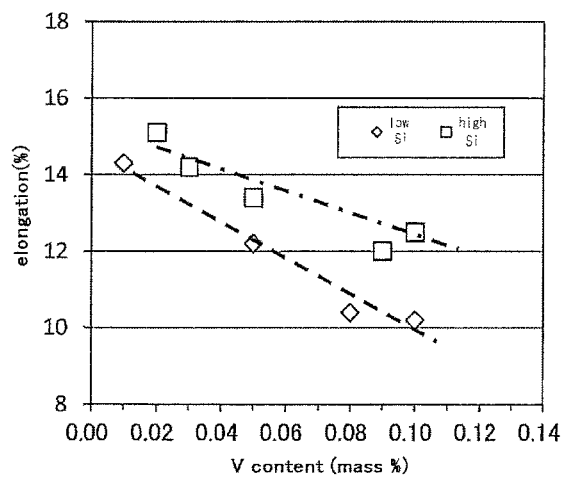
FIG. 13 is a diagram organizing a result of normal temperature elongation with the V content.
Figure 18:
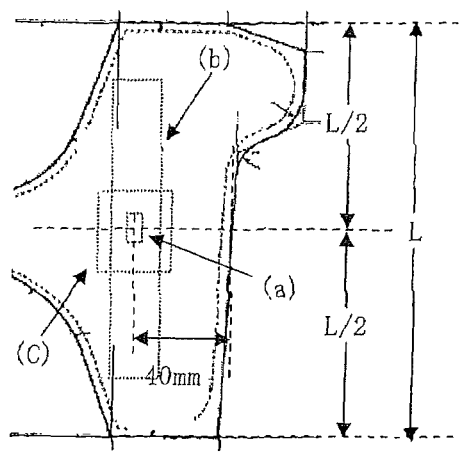
FIG. 18 is a view explaining a position where wear test specimen, a rolling contact fatigue test specimen and a Jominy test specimen were taken from the wheel produced in the example. With the positions shown by "a", "b" and "c" in the drawing as the references, the wear test specimen, the rolling contact fatigue test specimen and the Jominy test specimen were taken respectively.

[4] Wear Test:

For each of the steels, "wheel test specimen" for use in wear test specimen (the configuration shown in FIG. 5(*a*)) was taken, with the position 40 mm from the tread of the tread central portion of the rim portion (position shown by "a" in the drawing) as the reference as shown in FIG. 18. With use of these "wheel test specimens" and "rail test specimen" of steel 1, the wear test was performed under the conditions of the Hertzian stress: 2200 MPa, the slip ratio: 0.8%, and the revolutions: 776 rpm at the wheel side, and 800 rpm at the rail side by the Nishihara-type wear testing machine, and the test was carried out under dry condition. After the test was performed up to the number of cycles of $5 \times 10^5$ times, the amount of wear was obtained from the mass difference of the test specimen before and after the test.

Figure 4:
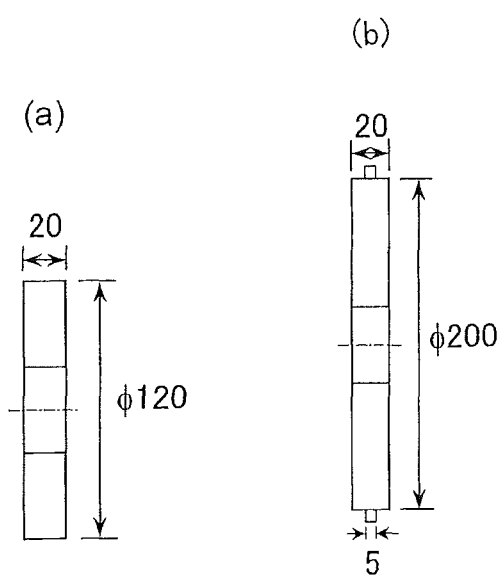
FIG. 4 is a view showing configurations of "wheel test specimen" and "rail test specimen" used in a rolling contact fatigue test. (a) in the drawing shows "wheel test specimen", and (b) shows "rail test specimen". Note that the unit of the dimensions in the drawing is "mm".

[5] Rolling Contact Fatigue Test:

For each of the steels, "wheel test specimen" for use in the rolling contact fatigue test specimen (the configuration shown in FIG. 4(*a*)) was taken with the position 40 mm from the tread of the tread central portion of the rim portion (position shown by "b" in the drawing) as the reference as shown in FIG. 18. With use of these "wheel test specimens" and "rail test specimen" of steel 1, the rolling contact fatigue test was performed under the conditions of the Hertzian stress: 1100 MPa, the slip ratio: 0.28%, the revolutions: 1000 rpm at the wheel side and 602 rpm at the rail side, and under water lubrication, and the number of cycles of detection of 0.5 G with an accelerometer was set as the rolling contact fatigue life, and evaluated.

[6] Jominy Test:

For each of the steels, a Jominy test specimen was taken with the position 40 mm from the tread of the tread central portion of the rim portion (position shown by "c" in the drawing) as the reference as shown in FIG. 18, and was austenitized at 900° C. for 30 minutes under air atmosphere, after which, end quench was performed, parallel cutting of 1.0 mm was performed next, the hardness distribution up to the position 50 mm from the water-cooled end was measured, and "M50%" was obtained.

[7] High Temperature Tensile Test

For each of the steels, in accordance with the ASTM E21 standard, the tensile test at 538° C. (1000° F.) was carried out, and the high temperature yield strength was measured.

[8] Normal Temperature Tensile Test

For each of the steels, the normal temperature tensile test was carried out in accordance with the ASTM E370 standard, and the normal temperature elongation was measured.

TABLE 5

| Steel No. | Hardness of rim portion (HBW) | Microstructure of rim portion Phase | Microstructure of rim portion Hypereutectic θ | Microstructure of hub portion Phase | Microstructure of hub portion Hypereutectic θ | Amount of wear (g) | Rolling fatigue life (cycle) | M50% (mm) | High temperature yield strength (MPa) | Normal temperature elongation (%) |
|---|---|---|---|---|---|---|---|---|---|---|
| 37 | 318 | P- | None | P | None | 0.318 | 1,865,869 | 5.2 | 297 | 15.2 |
| 38 | 342 | P + F | None | P + F | None | 0.338 | 2,785,401 | 10.9 | 424 | 15.8 |
| 39 | 366 | P | None | P | Present | 0.253 | 3,328,765 | 6.2 | 381 | 9.8 |
| 40 | 358 | P | None | P | None | 0.264 | 3,194,736 | 14.8 | 365 | 14.7 |
| 41 | 382 | P | None | P | None | 0.247 | 3,917,628 | 10.2 | 392 | 12.8 |
| 42 | 404 | P + B | None | P | None | 0.325 | 5,857,203 | 20.5 | 394 | 10.3 |
| 43 | 354 | P | None | P | None | 0.281 | 2,998,457 | 8.5 | 351 | 15.0 |
| 44 | 363 | P | None | P | None | 0.270 | 3,328,475 | 11.2 | 394 | 12.2 |
| 45 | 305 | P | None | P | None | 0.331 | 1,643,892 | 7.4 | 346 | 16.3 |
| 46 | 412 | P + B | None | P + B | None | 0.319 | 5,893,821 | 18.7 | 477 | 9.5 |
| 47 | 389 | P | None | P | None | 0.271 | 4,875,209 | 29.3 | 481 | 10.3 |
| 48 | 391 | P | None | P | None | 0.234 | 5,013,493 | 16.8 | 403 | 12.7 |
| 49 | 352 | P | None | P | None | 0.275 | 3,137,515 | 10.2 | 385 | 13.2 |
| 50 | 353 | P | None | P | None | 0.268 | 3,174,892 | 9.3 | 384 | 12.9 |
| 51 | 351 | P | None | P | None | 0.279 | 3,084,952 | 9.8 | 385 | 12.5 |
| 52 | 359 | P | None | P | None | 0.279 | 3,074,662 | 9.4 | 376 | 12.7 |
| 53 | 346 | P | None | P | None | 0.292 | 2,543,938 | 9.5 | 346 | 15.8 |
| 54 | 348 | P | None | P | None | 0.284 | 2,647,392 | 10.1 | 366 | 15.3 |
| 55 | 377 | P | None | P | None | 0.249 | 3,758,295 | 14.2 | 389 | 12.2 |
| 56 | 322 | P | None | P | None | 0.308 | 2,093,584 | 5.4 | 334 | 15.4 |
| 57 | 360 | P | None | P | None | 0.269 | 3,147,213 | 7.5 | 375 | 10.4 |
| 58 | 357 | P | None | P | None | 0.266 | 3,218,493 | 12.8 | 359 | 15.4 |
| 59 | 332 | P | None | P | None | 0.301 | 2,184,572 | 9.5 | 352 | 15.8 |
| 60 | 301 | P | None | P | None | 0.335 | 1,548,329 | 6.9 | 346 | 16.2 |
| 61 | 349 | P | None | P | None | 0.281 | 2,794,738 | 10.8 | 388 | 14.1 |
| 62 | 369 | P | None | P | None | 0.260 | 3,514,847 | 12.9 | 401 | 12.8 |
| 63 | 387 | P | None | P | None | 0.243 | 4,095,948 | 14.9 | 433 | 10.2 |

As shown in Table 5, steels 37 to 39, 42, 45 to 47, 56, 57, 60 and 63 which do not satisfy the conditions defined by the present invention were inferior as compared with steels 40, 41, 43, 44, 48 to 55, 58, 59, 61 and 62 which satisfy the conditions defined by the present invention, in any one or more tests of the wear test, the rolling contact fatigue test, the Jominy test, the high temperature tensile test and the normal temperature tensile test.

INDUSTRIAL APPLICABILITY

The steel for wheel of the present invention is excellent in balance of wear resistance, rolling contact fatigue resistance and spalling resistance, and can give a long life to the wheel. The wheel adopting the steel for wheel of the present invention has the amount of wear decreased by 30% at the largest, and the rolling contact fatigue life becomes as long as 3.2 times at the largest, and a low risk of spalling occurrence, as compared with the wheel adopting the steel for railway wheel of "Class C" of AAR. Further, the wheel adopting the steel for wheel of the present invention includes both high temperature strength and ductility, and therefore, has a low risk of occurrence of TMS and a crack on the tread. Accordingly, the steel for wheel of the present invention is extremely preferable for use as the railway wheels that are used under extremely harsh environments in which the traveling distances increase, and the loading capacities increase.

What is claimed is:

1. A steel for wheel comprising: in mass %,
C: 0.65 to 0.84%;
Si: 0.65 to 1.0%;
Mn: 0.50 to 1.40%;
Cr: 0.02 to 0.13%;
S: 0.04% or less and
V: 0.02 to 0.12%,
wherein Fn1 expressed by the following formula (1) is 32 to 43, and
Fn2 expressed by the following formula (2) is 25 or less, the balance being Fe and impurities, and
P, Cu and Ni in the impurities are
P: 0.05% or less,
Cu: 0.20% or less, and
NI: 0.20% or less:

$$Fn1 = 2.7 + 29.5 \times C + 2.9 \times Si + 6.9 \times Mn + 10.8 \times Cr + 30.3 \times Mo + 44.3 \times V \quad (1)$$

$$Fn2 = \exp(0.76) \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V) \quad (2)$$

where each symbol of element in the formulas (1) and (2) means content (mass %) of each element.

2. The steel for wheel according to claim 1, comprising, in mass %, Mo: 0.07% or less in place of a part of Fe, and a total content of V and Mo is 0.02 to 0.12%.

3. The steel for wheel according to claim 1, comprising, in mass %, Al: 0.20% or less in place of a part of Fe.

4. The steel for wheel according to claim 2, comprising, in mass %, AI: 0.20% or less in place of a part of Fe.

* * * * *

UNITED STATES PATENT AND TRADEMARK OFFICE
CERTIFICATE OF CORRECTION

PATENT NO. : 9,850,560 B2
APPLICATION NO. : 14/397241
DATED : December 26, 2017
INVENTOR(S) : Yamamoto et al.

Page 1 of 1

It is certified that error appears in the above-identified patent and that said Letters Patent is hereby corrected as shown below:

On the Title Page

The Abstract should read as follows:
A steel for wheel contains, in mass%, C: 0.65 to 0.84%, Si: 0.4 to 1.0%, Mn: 0.50 to 1.40%, Cr: 0.02 to 0.13%, S: 0.04% or less and V: 0.02 to 0.12%, wherein Fn1 expressed by formula (1) is 32 to 43, and Fn2 expressed by formula (2) is 25 or less, the balance being Fe and impurities. P, Cu and Ni as impurities are P: 0.05% or less, Cu: 0.20% or less and Ni: 0.20% or less:

$$Fn1 = 2.7 + 29.5 \times C + 2.9 \times Si + 6.9 \times Mn + 10.8 \times Cr + 30.3 \times Mo + 44.3 \times V \quad (1)$$
$$Fn2 = \exp(0.76) \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V) \quad (2).$$

The steel has excellent properties for use as a wheel.

Signed and Sealed this
Eighteenth Day of December, 2018

Andrei Iancu
*Director of the United States Patent and Trademark Office*